(12) United States Patent
Tsuchikawa et al.

(10) Patent No.: US 12,124,353 B2
(45) Date of Patent: Oct. 22, 2024

(54) OPERATION LOGS ACQUIRING DEVICE, OPERATION LOGS ACQUIRING METHOD, AND OPERATION LOGS ACQUIRING PROGRAM

(71) Applicant: Nippon Telegraph and Telephone Corporation, Tokyo (JP)

(72) Inventors: Kimio Tsuchikawa, Musashino (JP); Takeshi Masuda, Musashino (JP); Fumihiro Yokose, Musashino (JP); Sayaka Yagi, Musashino (JP); Yuki Urabe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 419 days.

(21) Appl. No.: 17/617,175

(22) PCT Filed: Jun. 11, 2019

(86) PCT No.: PCT/JP2019/023167
§ 371 (c)(1),
(2) Date: Dec. 7, 2021

(87) PCT Pub. No.: WO2020/250320
PCT Pub. Date: Dec. 17, 2020

(65) Prior Publication Data
US 2022/0342794 A1    Oct. 27, 2022

(51) Int. Cl.
*G06F 11/34*    (2006.01)
(52) U.S. Cl.
CPC ...... *G06F 11/3476* (2013.01); *G06F 2201/86* (2013.01)
(58) Field of Classification Search
None
See application file for complete search history.

(56) References Cited

U.S. PATENT DOCUMENTS 10,951,486 B2 *   3/2021   Masuda .............. G06F 3/04847

FOREIGN PATENT DOCUMENTS

| JP | 2004240759 | 8/2004 |
|---|---|---|
| JP | 2013015997 | 1/2013 |
| JP | 2015153210 | 8/2015 |

OTHER PUBLICATIONS

International Search Report in International Appln. No. PCT/JP2019/023167, dated Sep. 10, 2019, 5 pages (with English Translation).

(Continued)

*Primary Examiner* — Walter L Lindsay, Jr.
*Assistant Examiner* — Geoffrey T Evans
(74) *Attorney, Agent, or Firm* — Fish & Richardson P.C.

(57) ABSTRACT

An operation log acquisition device includes processing circuitry configured to store a determination image that is an image of a characteristic area of an operation screen that is used to perform a predetermined operation, an event occurrence area in which an event may occur when the predetermined operation is performed, operation type specifying information that specifies an operation type, and an acquisition image area that is to be acquired when the predetermined operation is performed, in association with each other, upon detecting an occurrence of the event, acquire an occurrence time of the event, an occurrence position of the event, and a captured image of the operation screen, and determine whether or not the captured image acquired includes a matching area that the determination image matches, and acquire an event occurrence area of the determination image if the captured image includes the matching area.

4 Claims, 23 Drawing Sheets

(56) References Cited

OTHER PUBLICATIONS

Ogasawara et al., "Development of Business Process Visualization/ Analysis System Utilizing Business Execution History," NTT Technical Journal, 2009.2:40-43, 9 pages (with English Translation).
Tsuchikawa et al., "Study of Operation Log Extraction Method from Legacy Systems," IEICE Technical Report, Jan. 14, 2010, 109(378):13-18, 7 pages (no English Translation).

* cited by examiner

Fig. 4

| OPERATION TYPE ID | OPERATION TYPE SPECIFYING INFORMATION | DETERMINATION IMAGE | DISTANCE TO OCCURRENCE AREA | SIZE OF OCCURRENCE AREA | SHAPE OF OCCURRENCE AREA | DISTANCE TO OPERATION IMAGE | SIZE OF OPERATION IMAGE | SHAPE OF OPERATION IMAGE |
|---|---|---|---|---|---|---|---|---|
| 1 | NAME INPUT | DETERMINATION IMAGE 1 | 20, 3 | 50, 8 | RECTANGLE | 0, 0 | 70, 11 | RECTANGLE |
| 2 | PREFECTURE NAME SELECTION | DETERMINATION IMAGE 1 | 20, 15 | 37, 8 | RECTANGLE | 0, 15 | 50, 11 | RECTANGLE |
| 3 | ADDRESS INPUT | DETERMINATION IMAGE 1 | 20, 27 | 50, 8 | RECTANGLE | 0, 27 | 70, 11 | RECTANGLE |
| 4 | SERVICE TYPE SELECTION | DETERMINATION IMAGE 1 | 43, 44 | 3 | CIRCLE | 0, 40 | 68, 20 | RECTANGLE |
| 5 | SERVICE TYPE SELECTION | DETERMINATION IMAGE 1 | 43, 51 | 3 | CIRCLE | 0, 40 | 68, 20 | RECTANGLE |
| 6 | SERVICE TYPE SELECTION | DETERMINATION IMAGE 1 | 43, 57 | 3 | CIRCLE | 0, 40 | 68, 20 | RECTANGLE |
| 7 | DELETE | DETERMINATION IMAGE 2 | 1, 2 | 20, 10 | RECTANGLE | 1, 1 | 22, 12 | RECTANGLE |
| 8 | SAVE | DETERMINATION IMAGE 2 | 33, 2 | 20, 10 | RECTANGLE | 33, 1 | 22, 12 | RECTANGLE |
| 9 | REGISTER | DETERMINATION IMAGE 2 | 65, 2 | 20, 10 | RECTANGLE | 64, 1 | 22, 12 | RECTANGLE |
| 10 | SERVICE A ADDITIONAL INFORMATION | DETERMINATION IMAGE 3 | 20, 29 | 50, 8 | RECTANGLE | 0, 20 | 70, 17 | RECTANGLE |

| ORDER ID ACQUISITION METHOD ID | DETERMINATION IMAGE | POSITION | SIZE | SHAPE |
|---|---|---|---|---|
| 1 | DETERMINATION IMAGE 4 | 20, 0 | 20, 10 | RECTANGLE |

Fig. 9

CASE ID:

```
CLICK ON NAME TEXT BOX (COORDINATES (40,30)) AT TIME 9:58 (OPERATION 1)
INPUT "a" INTO NAME TEXT BOX AT TIME 10:00 (OPERATION 2)
INPUT "a" INTO NAME TEXT BOX AT TIME 10:01 (OPERATION 3)
CLICK ON BLANK AREA (10,10) AT TIME 11:00 (OPERATION 4)
CLICK ON ARROW (COORDINATES (55,40)) OF PREFECTURE NAME PULL-DOWN MENU AT TIME 11:01 (OPERATION 5)
CLICK ON PREFECTURE NAME "TOKYO-TO" (45,60) AT TIME 11:02 (OPERATION 6)
CLICK ON SERVICE TYPE "SERVICE A" (COORDINATES (52,65)) AT TIME 11:10 (OPERATION 7)
CLICK ON TEXT BOOK (COORDINATES (50,90)) OF SERVICE A ADDITIONAL INFORMATION AT TIME 11:12 (OPERATION 8)
INPUT "i" INTO SERVICE A ADDITIONAL INFORMATION AT TIME 11:18 (OPERATION 9)
CLICK ON REGISTER BUTTON (COORDINATES (85,102)) AT TIME 12:18 (OPERATION 10)
```

```
            CUSTOMER INFORMATION
            REGISTRATION SCREEN

■CASE ID: 111111

■NAME         [              aa ]

■PREFECTURE  | HOKKAI-DO ▼ |
      NAME       | AOMORI-KEN  |
    ■ADDRESS     | IWATE-KEN   |
                 | AKITA-KEN   |

■SERVICE TYPE    ○ SERVICE A
                     ○ SERVICE B
                     ○ SERVICE C

[ DELETE ]    [ SAVE ]    [ REGISTER ]
```

Fig. 17

```
            CUSTOMER INFORMATION
            REGISTRATION SCREEN

■CASE ID: 111111

■NAME         [              aa ]

■PREFECTURE   [ TOKYO-TO ▼ ]
      NAME

■ADDRESS      [              ]

■SERVICE TYPE    ○ SERVICE A
                     ○ SERVICE B
                     ○ SERVICE C

[ DELETE ]    [ SAVE ]    [ REGISTER ]
```

Fig. 19

CUSTOMER INFORMATION
REGISTRATION SCREEN

■CASE ID: 111111

■NAME        [                aa]

■PREFECTURE  [TOKYO-TO ▼]
  NAME

■ADDRESS     [                  ]

■SERVICE TYPE   ● SERVICE A
                ○ SERVICE B
                ○ SERVICE C

■SERVICE A ADDITIONAL INFORMATION
[                                ]

[DELETE]   [SAVE]   [REGISTER]

Fig. 30

| OPERATION TIME | OPERATION TYPE SPECIFYING INFORMATION | OPERATION IMAGE | ORDER ID |
|---|---|---|---|
| 10:01 | NAME INPUT | OPERATION IMAGE 3 | 11111 |
| 11:01 | PREFECTURE NAME SELECTION | OPERATION IMAGE 5 | 11111 |
| 11:10 | SERVICE TYPE SELECTION | OPERATION IMAGE 7 | 11111 |
| 11:18 | SERVICE A ADDITIONAL INFORMATION | OPERATION IMAGE 9 | 11111 |
| 12:18 | REGISTRATION | OPERATION IMAGE 10 | 11111 |

701

OPERATION LOGS ACQUIRING DEVICE, OPERATION LOGS ACQUIRING METHOD, AND OPERATION LOGS ACQUIRING PROGRAM

CROSS-REFERENCE TO RELATED APPLICATIONS

This application is a National Stage application under 35 U.S.C. § 371 of International Application No. PCT/JP2019/023167, having an International Filing Date of Jun. 11, 2019. The disclosure of the prior application is considered part of the disclosure of this application, and is incorporated in its entirety into this application.

TECHNICAL FIELD

The present invention relates to an operation log acquisition device, an operation log acquisition method, and an operation log acquisition program.

BACKGROUND ART

In business analysis, it is effective to display an operation procedure in the form of a flowchart. When considering the business of providing services and products to customers, the procedure for operating a system for providing the same service and product is determined for each service and product, and such an operation procedure is shared among operators, using a manual or the like.

In addition, beginners are taught how to perform the operation procedure through training or by being guided by experts, and therefore the procedure for processing the same product and service should be the same operation procedure. However, in reality, it is normal that various irregular events that were not initially expected occur. For example, a customer may change the content of an order after placing the order, a product may be out of stock, or an operator makes an operation error. It is not realistic to prescribe operating procedures for all of such irregular events, and even if possible, it is difficult for operators to remember all the operation patterns and select an appropriate procedure.

Therefore, in reality, even for the same product/service, the operation procedure is generally different for each order. In grasping the actual business situation to improve the business, it is important to comprehensively grasp all operation patterns including such irregular events. This is because procedures for irregular events are not clearly defined and, for example, it is necessary to check how to proceed, consult the person in charge of the business about how to proceed, or there is a high possibility that an error occurs in the operation procedure, which often takes a longer time than the normal operation pattern.

In such a situation, it is effective to display an operation procedure in the form of a flowchart. For example, there is a proposal for a mechanism for clarifying difference between operating procedures for different orders by arranging operation procedures for the orders and displaying flowcharts that overlap each other, where, for each order, an operation log in which the operation time of the operator, the type of the operation (hereinafter referred to as an operation type), and information that identifies the order (hereinafter referred to as an order ID) are recorded, is used as an input.

Also, as a mechanism for enabling an analyst to acquire operation logs at a desired granularity level, there is a known technique regarding an operation screen for an GUI application, for example, of acquiring attribute values of GUI components that constitute the operation screen when an event occurs, and finding changes before and after the occurrence of the event. As a result, it is possible to only extract an event that has been changed, and also specify the operation at the same time.

However, in actual business, it is common that various applications such as a mailer, a Web, a business system, Word, Excel, and a scheduler are used to proceed with business. It is necessary to develop a mechanism to acquire the attribute values of GUI components and identify changes according to the execution environment of all these applications. However, it is not realistic due to very high costs. Even when the target application is developed, if the specifications of the target execution environment change due to version upgrade, it will be necessary to modify the application accordingly. In recent years, thin client environments have become widespread in companies, for the purpose of effective utilization of computer resources and improvements in security. In a thin client environment, applications are not installed on a terminal that the user actually operates (hereinafter referred to as a client terminal). Applications are installed on another terminal (server) that is connected to the client terminal. An operation screen provided by an application is displayed as an image on the client terminal, and the user operates the application on the server, using the displayed image. In this case, the operation screen is displayed as an image on the terminal that the user actually operates, and therefore it is impossible for the client terminal to acquire the attribute values of the GUI components described above.

In addition, there is a proposal for a mechanism for acquiring operation logs by utilizing events such as keyboard inputs and mouse clicks. With this mechanism, only the events that satisfy the conditions specified in advance are recorded as operation logs for each task upon being triggered by the events of mouse clicks and inputs from the enter key of the keyboard. Using this mechanism, it is possible to only extract events that are necessary for the analyst, while omitting events that are unnecessary for the analysis.

CITATION LIST

Patent Literature

[PTL 1] Japanese Laid-open Patent Publication No. 2015-153210
[PTL 2] Japanese Laid-open Patent Publication No. 2013-15997

Non Patent Literature

[NPL 1] Ogasawara et al., "Development of Business Process Visualization/Analysis System Utilizing Business Execution History", NTT Technical Journal, 2009.2, PP. 40-43

SUMMARY OF THE INVENTION

Technical Problem

However, there is a problem in that, with the conventional techniques, it may be impossible to enable an analyst to acquire events that are meaningful to the analyst regardless of the execution environment of an application.

Means for Solving the Problem

To solve the above-described problem and achieve the object, an operation log acquisition device according to the present invention includes: processing circuitry configured to: store a determination image that is an image of a characteristic area of an operation screen that is used to perform a predetermined operation, an event occurrence area in which an event may occur when the predetermined operation is performed, operation type specifying information that specifies an operation type, and an acquisition image area that is to be acquired when the predetermined operation is performed, in association with each other; upon detecting an occurrence of the event, acquire an occurrence time of the event, an occurrence position of the event, and a captured image of the operation screen; and determine whether or not the captured image acquired includes a matching area that the determination image matches, acquire an event occurrence area of the determination image if the captured image includes the matching area, acquire an operation image that is a captured image of the acquisition image area if the occurrence position of the event is included in the event occurrence area, and record operation type specifying information that corresponds to the determination image, the occurrence time of the event, and the operation image, in association with each other as an operation log.

Effects of the Invention

The present invention achieves an effect that events that are meaningful to an analyst can be acquired regardless of the execution environment of an application.

BRIEF DESCRIPTION OF DRAWINGS

FIG. 4 is a diagram showing an example of an operation type management table.

FIG. 9 is a diagram showing an example of a determination image 4.

FIG. 10 is a diagram showing an example of an image of an extracted order ID.

FIG. 11 is a diagram showing an example of an operation procedure.

FIG. 16 is a diagram showing an example of a captured image 5.

FIG. 17 is a diagram showing an example of a captured image 6.

FIG. 19 is a diagram showing an example of a captured image 8.

FIG. 30 is a diagram showing examples of operation logs.

DESCRIPTION OF EMBODIMENTS

The following describes embodiments of an operation log acquisition device, an operation log acquisition method, and an operation log acquisition program according to the present application in detail with reference to the drawings. Note that the operation log acquisition device, the operation log acquisition method, and the operation log acquisition program according to the present application are not limited to the embodiments.

[First Embodiment] The following embodiment describes a configuration of an operation log acquisition device 10 according to a first embodiment and the flow of processing that is performed by the operation lg acquisition device 10 one after the other, and describes the effects of the first embodiment at the end.

[Configuration of Operation Log Acquisition Device]

Figure 1:
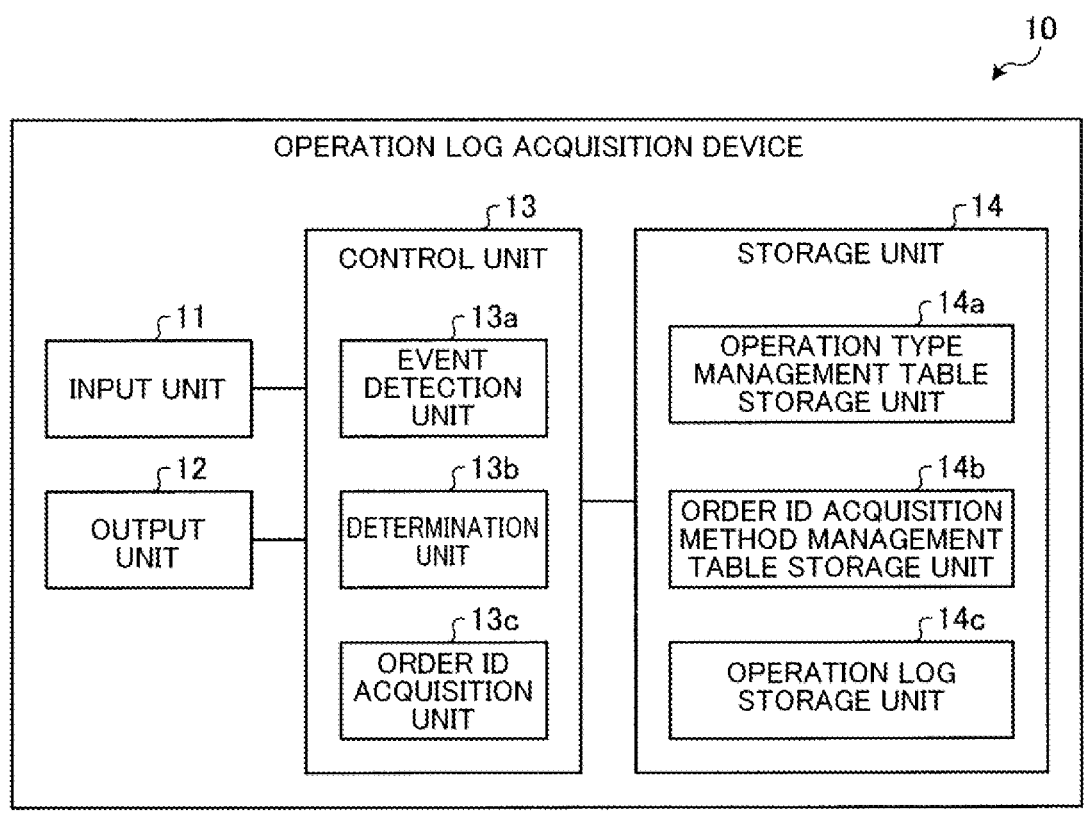
FIG. 1 is a diagram showing an example of a configuration of an operation log acquisition device according to a first embodiment.

First, a configuration of the operation log acquisition device 10 will be described with reference to FIG. 1. FIG. 1 is a diagram showing an example of a configuration of the operation log acquisition device 10 according to the first embodiment. As shown in FIG. 1, the operation log acquisition device 10 includes an input unit 11, an output unit 12, a control unit 13, and a storage unit 14. The following describes processing that is performed by the units included in the operation log acquisition device 10.

Figure 2:
FIG. 2 is a diagram showing an example of an operation screen.
Figure 3:
FIG. 3 is a diagram showing an example of the operation screen.

The input unit 11 is realized using an input device such as a keyboard or a mouse, and inputs various kinds of instruction information to the control unit 13 in response to an operation input from an operator. The output unit 12 is realized using a display device such as a liquid crystal display, a printing device such as a printer, an information communication device, a speaker, or the like. For example, the output unit 12 displays operation screens illustrated in FIGS. 2 and 3. FIGS. 2 and 3 are diagrams each showing an example of an operation screen. Note that an operation screen 101 illustrated in FIG. 2 changed to an operation screen 102 illustrated in FIG. 3 upon a service A being selected. The output unit 12 also outputs an operation log stored in an operation log storage unit 14c described below.

The storage unit 14 stores data and a program that are necessary for the control unit 13 to perform various kinds of processing. The storage unit 14 includes an operation type management table storage unit 14a, an order ID acquisition method management table storage unit 14b, and an operation log storage unit 14c. For example, the storage unit 14 is a RAM (Random Access Memory), a semiconductor memory element such as a Flash Memory, or a storage device such as a hard disk or an optical disc.

The operation type management table storage unit 14a stores an operation type management table in which determination images, which are images of a characteristic area of an operation screen that is used to perform a predetermined operation, an event occurrence area in which an event may occur when a predetermined operation is performed, operation type specifying information that specifies an operation type, and an acquisition image area that is to be acquired when a predetermined operation is performed, are associated with each other.

Here, the event occurrence area is specified by using the distance (X,Y) from the top left of the matching area of a determination image in the image of the operation screen, and the size and the shape (rectangle, circle) of the event occurrence area. The acquisition image area is specified by using the distance (X,Y) from the top left of the matching area of the determination image in the operation screen, and the size and the shape (rectangle, circle) of the acquisition image area.

For example, as illustrated in FIG. 4, the operation type management table storage unit 14a stores operation type IDs that are pieces of information each for uniquely identifying a determination condition for an operation type, operation type specifying information, determination images, the distance to the occurrence area, the size of the occurrence area, the shape of the occurrence areas, the distance to the operation image, the size of the operation image, and the shape of the operation image, in association with each other.

Figure 5:
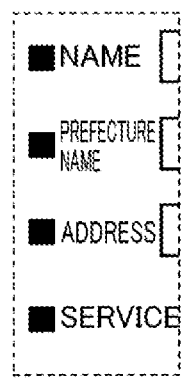
FIG. 5 is a diagram showing an example of a determination image 1.
Figure 6:
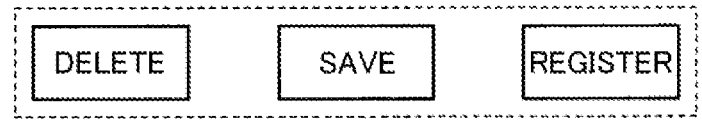
FIG. 6 is a diagram showing an example of a determination image 2.
Figures 7, 8:
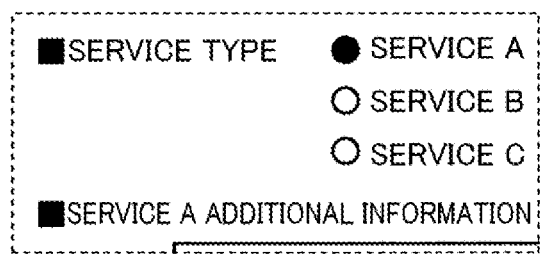
FIG. 7 is a diagram showing an example of a determination image 3.
FIG. 8 is a diagram showing an example of an order ID acquisition method management table.
Figure 12:
FIG. 12 is a diagram showing an example of a captured image 1.

The operation type management table storage unit 14a also stores data of determination images in the operation type management table. For example, in the example in FIG. 4, determination images 1 to 3 are recorded in the operation type management table, and therefore the operation type management table storage unit 14a stores the image data of the determination images 1 to 3. Here, determination images are illustrated in FIGS. 5 to 7. FIGS. 5 to 7 are diagrams showing examples of determination images. FIG. 5 shows the determination image 1, FIG. 6 shows the determination image 2, and FIG. 7 shows the determination image 3.

The order ID acquisition method management table storage unit 14b stores in advance an order ID acquisition method management table as rules for the acquisition of order IDs. Specifically, the order ID acquisition method management table is used to mage method for acquiring an order ID in the operation screen, and holds information used to specify a display area for the order ID. For example, the order ID acquisition method management table specifies a method by using a determination image that is a characteristic image that is displayed when an order ID is displayed, the distance (X,Y) from the top left of the matching area of the determination image, and the size and the shape (rectangle, circle) thereof.

For example, as illustrated in FIG. 8, the order ID acquisition method management table storage unit 14b stores an operation type management table in which an order ID acquisition method ID a determination image, a position, a size, and a shape are associated with each other.

The order ID acquisition method management table storage unit 14b also stores the data of determination images in the order ID acquisition method management table. For example, in the example in FIG. 8, a determination image 4 is recorded in the order ID acquisition method management table, and therefore the order ID acquisition method management table storage unit 14b stores the image data of the determination image 4. Here, the determination image 4 is illustrated in FIG. 9. FIG. 9 is a diagram showing an example of a determination image. Also, an image of an order ID extracted by an order ID acquisition unit 13c described below is shown in FIG. 10. FIG. 10 is a diagram showing an example of an image of an extracted order ID. In the example in FIG. 10, an image in which the order ID (the case ID) is "111111" is illustrated.

The control unit 13 includes an internal memory for storing a program that defines various processing procedures or the like and necessary data, and uses them to perform various kinds of processing. For example, the control unit 13 is an electronic circuit such as a CPU (Central Processing Unit) or an MPU (Micro Processing Unit), or an integrated circuit such as an ASIC (Application Specific Integrated Circuit) or an FPGA (Field Programmable Gate Array). The control unit 13 includes an event detection unit 13a, a determination unit 13b, and an order ID acquisition unit 13c.

The event detection unit 13a, upon detecting an occurrence of an event, acquires the time at which the event occurred, the position at which the event occurred, and a captured image of the operation screen. For example, the event detection unit 13a has the function of detecting an event such as a keyboard input or a mouse click occurring, and the function of, upon detecting an event, acquiring the captured image of the operation screen, and notifying the determination unit of the time at which the event occurred, the position at which the event occurred, and the captured image of the operation screen.

Regarding the detection of the occurrence of an event, the event detection unit 13a can be realized by using a global hook in the case of the Windows (registered trademark) OS, for example. Similarly, the event detection unit 13a can acquire regarding the position at which the event occurred by using a global hook in the case of a mouse click, for example.

Regarding a keyboard input, for example, there may be no general means to acquire the input position from the OS. However, a keyboard input usually involves the input of a character string, and therefore the event detection unit 13a can specify the position at which the event occurred by comparing captured images before and after the occurrence of the event. Note that a change is not limited to occurring at one point, and may occur within an area. A change may occur at any coordinate point included in the area. In addition, although keyboard inputs include operations that do not involve the input of a character string, such as a Tab key input, a direction key input, and a shift key input, these are often meaningless in analysis and are therefore ignored in the present embodiment.

The determination unit 13b determines whether or not an area that the determination image matches is included in the captured image acquired by the event detection unit 13a, and if there is such a matching area, the determination unit 13b acquires the event occurrence area in the determination image. If the position at which the event occurred is included in the event occurrence area, the determination unit 13b acquires an operation image that is the captured image of the acquisition image area, and records the operation type specifying information, the event occurrence time, and the operation image corresponding to the determination image in the operation log storage unit 14c in association with each other as an operation log.

For example, the determination unit 13b has the function of receiving a notification from the event detection unit 13a. Also, upon receiving a notification, the determination unit 13b determines whether or not the image indicated by the notification includes an area that the determination image recorded in the operation type management table matches, and calculates, for the corresponding determination image, the event occurrence area, from the matching position. Furthermore, the determination unit 13b has the function of, if the position at which the event occurred is included in the event occurrence area, acquiring the captured image (operation image) of the acquisition image area associated with the operation type, and recording the operation type specifying information regarding the determination image, the occurrence time of the event, and the operation image as an operation log. However, if events of the same operation type consecutively occurred, the determination unit 13b only records information regarding the last event. Note that the determination unit 13b may output operation logs to a file in the CSV format, or to Excel or a database in a tabular format.

Upon an operation screen being displayed, the order ID acquisition unit 13c acquires information that specifies the order from the operation screen based on a preset rule, and records the acquire information in the storage unit as an operation log. For example, the order ID acquisition unit 13c acquires a rule that is stored in the order ID acquisition method management table storage unit 14b, acquire an image of the order ID (case ID) from the operation screen according to the rule, specifies the order ID from the image, and records the order ID in the operation log storage unit 14c as an operation log.

The following describes in detail the flow of processing that is performed when the operator performs operation according to the operation procedure 208 illustrated in FIG. 11 on the operation screen 101 illustrated in FIG. 2. In the present embodiment, the following operation types are regarded as meaningful operation types for analysis.

An operation that is performed to input a character string into a text box located on the right side of a name label (hereinafter referred to as an operation type 1)

An operation that is performed to select a specific prefecture name from a pull-down menu located on the right side of a prefecture name label (hereinafter referred to as an operation type 2)

An operation that is performed to input a character string into a text box located on the right side of an address label (hereinafter referred to as an operation type 3)

An operation that is performed to select a service type A from service type radio buttons (hereinafter referred to as an operation type 4)

An operation that is performed to select a service type B from service type radio buttons (hereinafter referred to as an operation type 5)

An operation that is performed to select a service type C from service type radio buttons (hereinafter referred to as an operation type 6)

An operation that is performed to click on a delete button (hereinafter referred to as an operation type 7)

An operation that is performed to click on a save button (hereinafter referred to as an operation type 8)

An operation that is performed to click on a registration button (hereinafter referred to as an operation type 9)

An operation that is performed to input a character string into a text box located immediately below a service additional information A label (hereinafter referred to as an operation type 10)

An operation type management table 103 is recorded regarding these operation types. In the selection of a determination image, it takes a certain amount of time until the content of an event is notified to a target application and the content is reflected on the operation screen. Therefore, when selecting a determination image, it is necessary to select the determination image considering the timing of detecting an event and the time until the content of operation is reflected on the operation screen. Similarly, the operation image is used to check the content of an operation, and therefore it is necessary to acquire the operation image after the content of the operation is reflected on the operation screen. Therefore, it is desirable that the operation image is acquired with a delay of a certain period of time from when the event is detected.

Next, a method for acquiring an order ID in the present embodiment will be described. For example, in the operation screens 101 and 102, the order ID acquisition unit 13c employs a case ID label display area, which is displayed next to the case ID, as a determination image. The method is set in advance as an order ID acquisition method management table 104. Although only one acquisition method is described in the present embodiment, there may be a plurality of acquisition methods. In such a case, acquisition processing is repeated until a matching area is present.

Next, order ID acquisition processing will be described. The order ID acquisition unit 13c acquires, as an order ID acquisition method, the determination image 4, the display position of the operation screen, and rectangle information from the order ID acquisition method table, and thereafter acquires a captured image of the operation screen 101, and searches for a matching area of the determination image 4.

In the present embodiment, there is a matching area, and the order ID acquisition unit 13c acquires (9,10) as the top left coordinates of the matching area. Next, the order ID acquisition unit 13c extracts an image of a rectangular area that has the top left coordinates (29,10) and the bottom right coordinates (49,20) to acquire an image 301. If a plurality of acquisition methods are included in the order ID acquisition method management table the above processing is repeated until the determination image matches.

The following describes operations that are performed when the operator operates the operation screen 101 according to an operation procedure 208 with reference to FIGS. 12 to 21. FIGS. 12 to 21 are diagrams showing examples of captured images. The captured images shown in FIGS. 12 to 21 are captured images of the operation screen 101 that changes upon each of the operations 1 to 10 included in the operation procedure 208 being respectively performed.

First, upon the operation 1 being performed, the event detection unit 13a detects the occurrence time "9:58" and the event occurrence position (40,30), and acquires a captured image 1 (see FIG. 12) as the captured image of the operation screen at the time. Thereafter, the event detection unit 13a notifies the determination unit 13b of the occurrence time "9:58", the event occurrence position (40,30), and the captured image 1.

Next, the determination unit 13b determines whether or not the determination images recorded in the operation type management table are present in the captured image 1 indicated by the notification, and calculates the occurrence position of the event in each of the determination image 1 and the determination image 2 that are present.

Regarding the determination image 1, the top left coordinates of the matching position are (10,20), and the determination unit 13b calculates the display area, considering the position, the size, and the shape specified in each operation type. For the operation type 1, a rectangular area with the top left at (30,23) and the bottom right at (80,31) is acquired. For the operation type 2, a rectangular area with the top left at (30,35) and the bottom right at (67, 43) is acquired. For the operation type 3, a rectangular area with the top left at (30,47) and the top right at (80,55) is acquired. For the operation type 4, a circular area centered around (53,64) is acquired. For the operation type 5, a circular area centered around (53,71) is acquired. For the operation type 6, a circular area centered around (53,77) is acquired.

Regarding the determination image 2, the top left coordinates of the matching position are (8,81), and the determination unit 13b calculates the display area, considering the position, the size, and the shape specified in the operation type. For the operation type 7, a rectangular area with the top left at (9,83) and the bottom right at (29,93) is acquired. For the operation type 8, a rectangular area with the top left at (41,83) and the bottom right at (61, 93) is acquired. For the operation type 9, a rectangular area with the top left at (73, 83) and the top right at (93,93) is acquired.

Figure 22:
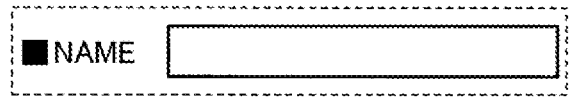
FIG. 22 is a diagram showing an example of an operation image 1 recorded as an operation log.

The event occurrence position (40,30) indicated by the notification is included in the area corresponding to the operation type 1. Therefore, the determination unit 13b records the event occurrence time, the operation type 1, and the operation image 1 illustrated in FIG. 22, which is the captured image of a rectangular area moved from the matching position (10,20) by (0,0) and having a size (70,11), as an operation log. FIG. 22 is a diagram showing an example of the operation image 1 recorded as an operation log.

Figure 13:
FIG. 13 is a diagram showing an example of a captured image 2.

Next, upon the operation 2 being performed, the event detection unit 13a acquires the occurrence time "10:00" of the event and the captured image 2 (see FIG. 13). Regarding the event occurrence position, the event detection unit 13a compares the captured image 2 at the time of the occurrence of the event and the captured image 1 at the time of the occurrence of the previous event, and acquires an event occurrence position (78,26). Thereafter, the event detection unit 13a notifies the determination unit of the occurrence time "10:00", the event occurrence position (78,26), and the captured image 2.

Next, the determination unit 13b determines whether or not the determination images recorded in the operation type management table are present in the captured image 2 indicated by the notification, and calculates the occurrence position of the event in each of the determination image 1 and the determination image 2 that are present.

Regarding the determination image 1, the top left coordinates of the matching position are (10,20), and the determination unit 13b calculates the display area, considering the position, the size, and the shape specified in each operation type. For the operation type 1, a rectangular area with the top left at (30,23) and the bottom right at (80,31) is acquired. For the operation type 2, a rectangular area with the top left at (30,35) and the bottom right at (67, 43) is acquired. For the operation type 3, a rectangular area with the top left at (30,47) and the top right at (80,55) is acquired. For the operation type 4, a circular area centered around (53,64) is acquired. For the operation type 5, a circular area centered around (53,71) is acquired. For the operation type 6, a circular area centered around (53,77) is acquired.

Regarding the determination image 2, the top left coordinates of the matching position are (8,81), and the determination unit 13b calculates the display area, considering the position, the size, and the shape specified in the operation type. For the operation type 7, a rectangular area with the top left at (9,83) and the bottom right at (29,93) is acquired. For the operation type 8, a rectangular area with the top left at (41,83) and the bottom right at (61, 93) is acquired. For the operation type 9, a rectangular area with the top left at (73, 83) and the top right at (93,93) is acquired.

Figure 23:
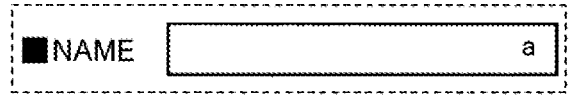
FIG. 23 is a diagram showing an example of an operation image 2 recorded as an operation log.

The event occurrence position (78,26) indicated by the notification is included in the area corresponding to the operation type 1. Therefore, the determination unit 13b records the event occurrence time, the operation type 1, and the operation image 2 illustrated in FIG. 23, which is the captured image of a rectangular area moved from the matching position (10,20) by (0,0) and having a size (70,11), as an operation log. FIG. 23 is a diagram showing an example of the operation image 2 recorded as an operation log. Here, the operation type is the same as that of the operation 1 performed immediately before the operation 2, and therefore the determination unit 13b deletes the record of the operation 1 from the operation log.

Figure 14:
FIG. 14 is a diagram showing an example of a captured image 3.
Figure 15:
FIG. 15 is a diagram showing an example of a captured image 4.
Figure 18:
FIG. 18 is a diagram showing an example of a captured image 7.
Figure 20:
FIG. 20 is a diagram showing an example of a captured image 9.
Figure 21:
FIG. 21 is a diagram showing an example of a captured image 10.

Next, upon the operation 3 being performed, the event detection unit 13a acquires the occurrence time "10:01" of the event and the captured image 3 (see FIG. 14). Regarding the event occurrence position, the event detection unit 13a compares the captured image 3 at the time of the occurrence of the event and the captured image 2 at the time of the occurrence of the previous event, and acquires an event occurrence position (78,26). Thereafter, the event detection unit 13a notifies the determination unit of the occurrence time "10:01", the event occurrence position (78,26), and the captured image 3.

Next, the determination unit 13b determines whether or not the determination images recorded in the operation type management table are present in the captured image 3 indicated by the notification, and calculates the occurrence position of the event in each of the determination image 1 and the determination image 2 that are present.

Regarding the determination image 1, the top left coordinates of the matching position are (10,20), and the determination unit 13b calculates the display area, considering the position, the size, and the shape specified in each operation type. For the operation type 1, a rectangular area with the top left at (30,23) and the bottom right at (80,31) is acquired. For the operation type 2, a rectangular area with the top left at (30,35) and the bottom right at (67, 43) is acquired. For the operation type 3, a rectangular area with the top left at (30,47) and the top right at (80,55) is acquired. For the operation type 4, a circular area centered around (53,64) is acquired. For the operation type 5, a circular area centered around (53,71) is acquired. For the operation type 6, a circular area centered around (53,77) is acquired.

Regarding the determination image 2, the top left coordinates of the matching position are (8,81), and the determination unit 13b calculates the display area, considering the position, the size, and the shape specified in the operation type. For the operation type 7, a rectangular area with the top left at (9,83) and the bottom right at (29,93) is acquired. For the operation type 8, a rectangular area with the top left at (41,83) and the bottom right at (61, 93) is acquired. For the operation type 9, a rectangular area with the top left at (73, 83) and the top right at (93,93) is acquired.

Figure 24:
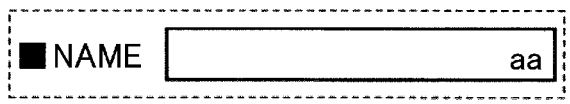
FIG. 24 is a diagram showing an example of an operation image 3 recorded as an operation log.

The event occurrence position (78,26) indicated by the notification is included in the area corresponding to the operation type 1. Therefore, the determination unit 13b records the event occurrence time, the operation type 1, and the operation image 3 illustrated in FIG. 24, which is the captured image of a rectangular area moved from the matching position (10,20) by (0,0) and having a size (70,11), as an operation log. FIG. 24 is a diagram showing an example of the operation image 3 recorded as an operation log. Here, the operation type is the same as that of the operation 2 performed immediately before the operation 3, and therefore the determination unit 13b deletes the record of the operation 2 from the operation log.

Next, upon the operation 4 being performed, the event detection unit 13a acquires the occurrence time "11:00" and the event occurrence position (10,10), acquires a captured image 4 (see FIG. 15) as the captured image of the operation screen at the time, and notifies the determination unit 13b of the occurrence time "11:00", the event occurrence position (10,10), and the captured image 4.

Next, the determination unit 13b determines whether or not the determination images recorded in the operation type management table are present in the captured image 4 indicated by the notification, and calculates the occurrence position of the event in each of the determination image 1 and the determination image 2 that are present.

Regarding the determination image 1, the top left coordinates of the matching position are (10,20), and the determination unit 13b calculates the display area, considering the position, the size, and the shape specified in each operation type. For the operation type 1, a rectangular area with the top left at (30,23) and the bottom right at (80,31) is acquired. For the operation type 2, a rectangular area with the top left at (30,35) and the bottom right at (67, 43) is acquired. For the operation type 3, a rectangular area with the top left at (30,47) and the top right at (80,55) is acquired. For the operation type 4, a circular area centered around (53,64) is acquired. For the operation type 5, a circular area centered around (53,71) is acquired. For the operation type 6, a circular area centered around (53,77) is acquired.

Regarding the determination image 2, the top left coordinates of the matching position are (8,81), and the determination unit 13b calculates the display area, considering the position, the size, and the shape specified in the operation type. For the operation type 7, a rectangular area with the top left at (9,83) and the bottom right at (29,93) is acquired. For the operation type 8, a rectangular area with the top left at (41,83) and the bottom right at (61, 93) is acquired. For the operation type 9, a rectangular area with the top left at (73, 83) and the top right at (93,93) is acquired.

The event occurrence position (10,10) indicated by the notification is not included in the event occurrence positions of the operation types, and therefore the determination unit 13b does not record the event occurrence position in the operation log.

Next, upon the operation 5 being performed, the event detection unit 13a acquires the occurrence time "11:01" and the event occurrence position (55,40), acquires a captured image 5 (see FIG. 16) as the captured image of the operation screen at the time, and notifies the determination unit 13b of the occurrence time "11:01", the event occurrence position (55,40), and the captured image 5.

Next, the determination unit 13b determines whether or not the determination images recorded in the operation type management table are present in the captured image 5 indicated by the notification, and calculates the occurrence position of the event in each of the determination image 1 and the determination image 2 that are present. Regarding the determination image 1, the top left coordinates of the matching position are (10,20), and the determination unit 13b calculates the display area, considering the position, the size, and the shape specified in each operation type. For the operation type 1, a rectangular area with the top left at (30,23) and the bottom right at (80,31) is acquired. For the operation type 2, a rectangular area with the top left at (30,35) and the bottom right at (67, 43) is acquired. For the operation type 3, a rectangular area with the top left at (30,47) and the top right at (80,55) is acquired. For the operation type 4, a circular area centered around (53,64) is acquired. For the operation type 5, a circular area centered around (53,71) is acquired. For the operation type 6, a circular area centered around (53,77) is acquired.

Regarding the determination image 2, the top left coordinates of the matching position are (8,81), and the determination unit 13b calculates the display area, considering the position, the size, and the shape specified in the operation type. For the operation type 7, a rectangular area with the top left at (9,83) and the bottom right at (29,93) is acquired. For the operation type 8, a rectangular area with the top left at (41,83) and the bottom right at (61, 93) is acquired. For the operation type 9, a rectangular area with the top left at (73, 83) and the top right at (93,55) is acquired.

Figure 25:
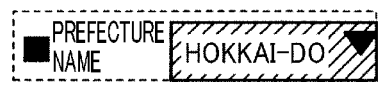
FIG. 25 is a diagram showing an example of an operation image 5 recorded as an operation log.

The event occurrence position (55,40) indicated by the notification is included in the area corresponding to the operation type 2. Therefore, the determination unit 13b records the event occurrence time, the operation type 2, and the operation image 5 illustrated in FIG. 25, which is the captured image of a rectangular area moved from the matching position (10,20) by (0,15) and having a size (50,11), as an operation log. FIG. 25 is a diagram showing an example of the operation image 5 recorded as an operation log.

Next, upon the operation 6 being performed, the event detection unit 13a acquires the occurrence time "11:02" and the event occurrence position (45, 60), acquires a captured image 6 (see FIG. 17) as the captured image of the operation screen at the time, and notifies the determination unit 13b of the occurrence time "11:02", the event occurrence position (45,60), and the captured image 6.

Next, the determination unit 13b determines whether or not the determination images recorded in the operation type management table are present in the captured image 6 indicated by the notification, and calculates the occurrence position of the event in the determination image 2 that is present. Regarding the determination image 2, the top left coordinates of the matching position are (8,81), and the determination unit 13b calculates the display area, considering the position, the size, and the shape specified in the operation type. For the operation type 7, a rectangular area with the top left at (9,83) and the bottom right at (29,93) is acquired. For the operation type 8, a rectangular area with the top left at (41,83) and the bottom right at (61,93) is acquired. For the operation type 9, a rectangular area with the top left at (73,83) and the top right at (93,93) is acquired.

The event occurrence position (45,60) indicated by the notification is not included in the event occurrence positions of the operation types, and therefore the determination unit 13b does not record the event occurrence position in the operation log.

Next, upon the operation 7 being performed, the event detection unit 13a acquires the occurrence time "11:10" and the event occurrence position (52,65), acquires a captured image 7 (see FIG. 18) as the captured image of the operation screen at the time, and notifies the determination unit 13b of the occurrence time "11:10", the event occurrence position (52,65), and the captured image 7.

Next, the determination unit 13b determines whether or not the determination images recorded in the operation type management table are present in the captured image 7 indicated by the notification, and calculates the occurrence position of the event in each of the determination image 1 and the determination image 2 that are present. Regarding the determination image 1, the top left coordinates of the matching position are (10,20), and the determination unit 13b calculates the display area, considering the position, the size, and the shape specified in each operation type. For the operation type 1, a rectangular area with the top left at (30,23) and the bottom right at (80,31) is acquired. For the operation type 2, a rectangular area with the top left at (30,35) and the bottom right at (67, 43) is acquired. For the operation type 3, a rectangular area with the top left at (30,47) and the top right at (80,55) is acquired. For the operation type 4, a circular area centered around (53,64) is acquired. For the operation type 5, a circular area centered around (53,71) is acquired. For the operation type 6, a circular area centered around (53,77) is acquired.

Regarding the determination image 2, the top left coordinates of the matching position are (8,81), and the determination unit 13b calculates the display area, considering the position, the size, and the shape specified in the operation type. For the operation type 7, a rectangular area with the top left at (9,83) and the bottom right at (29,93) is acquired. For the operation type 8, a rectangular area with the top left at (41,83) and the bottom right at (61, 93) is acquired. For the operation type 9, a rectangular area with the top left at (73, 83) and the top right at (93,93) is acquired.

Figure 26:
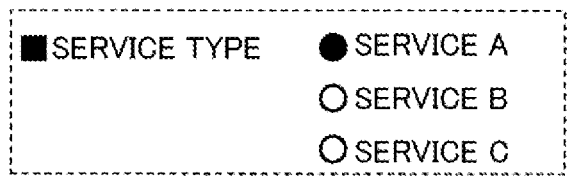
FIG. 26 is a diagram showing an example of an operation image 7 recorded as an operation log.

The event occurrence position (52,65) indicated by the notification is included in the area corresponding to the operation type 4. Therefore, the determination unit 13b records the event occurrence time, the operation type 4, and the operation image 7 illustrated in FIG. 26, which is the captured image of a rectangular area moved from the matching position (10,20) by (0,40) and having a size (68,20), as an operation log. FIG. 26 is a diagram showing an example of the operation image 7 recorded as an operation log.

Next, upon the operation 8 being performed, the event detection unit 13a acquires the occurrence time "11:12" and the event occurrence position (50,90), acquires a captured image 8 (see FIG. 19) as the captured image of the operation screen at the time, and notifies the determination unit 13b of the occurrence time "11:12", the event occurrence position (50,90), and the captured image 8.

Next, the determination unit 13b determines whether or not the determination images recorded in the operation type management table are present in the captured image 8 indicated by the notification, and calculates the occurrence position of the event in each of the determination image 1, the determination image 2, and the determination image 3 that are present. Regarding the determination image 1, the top left coordinates of the matching position are (10,20), and the determination unit 13b calculates the display area, considering the position, the size, and the shape specified in each operation type. For the operation type 1, a rectangular area with the top left at (30,23) and the bottom right at (80,31) is acquired. For the operation type 2, a rectangular area with the top left at (30,35) and the bottom right at (67,43) is acquired. For the operation type 3, a rectangular area with the top left at (30,47) and the top right at (80,55) is acquired. For the operation type 4, a circular area centered around (53,64) is acquired. For the operation type 5, a circular area centered around (53,71) is acquired. For the operation type 6, a circular area centered around (53,77) is acquired.

Regarding the determination image 2, the top left coordinates of the matching position are (8,97), and the determination unit 13b calculates the display area, considering the position, the size, and the shape specified in the operation type. For the operation type 7, a rectangular area with the top left at (9,83) and the bottom right at (29,109) is acquired. For the operation type 8, a rectangular area with the top left at (41,83) and the bottom right at (61,109) is acquired. For the operation type 9, a rectangular area with the top left at (73,83) and the top right at (93,109) is acquired.

Regarding the determination image 3, the top left coordinates of the matching position are (8,59), and the determination unit 13b calculates the display area, considering the position, the size, and the shape specified in the operation type. For the operation type 10, a rectangular area with the top left at (8,79) and the bottom right at (78,96) is acquired.

Figure 27:
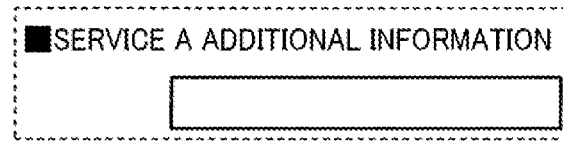
FIG. 27 is a diagram showing an example of an operation image 8 recorded as an operation log.

The event occurrence position (50,90) indicated by the notification is included in the area corresponding to the operation type 10. Therefore, the determination unit 13b records the event occurrence time, the operation type 10, and the operation image 8 illustrated in FIG. 27, which is the captured image of a rectangular area moved from the matching position (8,59) by (0,20) and having a size (70,17), as an operation log. FIG. 27 is a diagram showing an example of the operation image 8 recorded as an operation log.

Next, upon the operation 9 being performed, the event detection unit 13a acquires the occurrence time "11:18" and the event occurrence position (78,92), acquires a captured image 9 (see FIG. 20) as the captured image of the operation screen at the time, and notifies the determination unit 13b of the occurrence time "11:18", the event occurrence position (78,92), and the captured image 9.

Next, the determination unit 13b determines whether or not the determination images recorded in the operation type management table are present in the captured image 9 indicated by the notification, and calculates the occurrence position of the event in each of the determination image 1, the determination image 2, and the determination image 3 that are present. Regarding the determination image 1, the top left coordinates of the matching position are (10,20), and the determination unit 13b calculates the display area, considering the position, the size, and the shape specified in each operation type. For the operation type 1, a rectangular area with the top left at (30,23) and the bottom right at (80,31) is acquired. For the operation type 2, a rectangular area with the top left at (30,35) and the bottom right at (67,43) is acquired. For the operation type 3, a rectangular area with the top left at (30,47) and the top right at (80,55) is acquired. For the operation type 4, a circular area centered around (53,64) is acquired. For the operation type 5, a circular area centered around (53,71) is acquired. For the operation type 6, a circular area centered around (53,77) is acquired.

Regarding the determination image 2, the top left coordinates of the matching position are (8,97), and the determination unit 13b calculates the display area, considering the position, the size, and the shape specified in the operation type. For the operation type 7, a rectangular area with the top left (9,83) and the bottom right (29,109) is acquired. For the operation type 8, a rectangular area with the top left (41,83) and the bottom right (61,109) is acquired. For the operation type 9, a rectangular area with the top left (73,83) and the top right (93,109) is acquired.

Regarding the determination image 3, the top left coordinates of the matching position are (8,59), and the determination unit 13b calculates the display area, considering the position, the size, and the shape specified in the operation type. For the operation type 10, a rectangular area with the top left at (8,79) and the bottom right at (78,96) is acquired.

Figure 28:
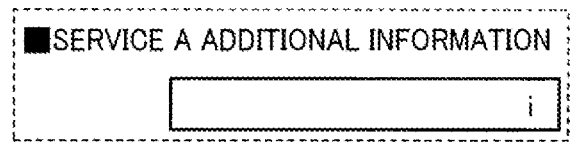
FIG. 28 is a diagram showing an example of an operation image 9 recorded as an operation log.

Next, the event occurrence position (50,90) indicated by the notification is included in the area corresponding to the operation type 10. Therefore, the determination unit 13b records the event occurrence time, the operation type 10, and the operation image 9 illustrated in FIG. 28, which is the captured image of a rectangular area moved from the matching position (8,59) by (0,20) and having a size (70,17), as an operation log. FIG. 28 is a diagram showing an example of the operation image 9 recorded as an operation log. Here, the operation type is the same as that of the operation 8 performed immediately before the operation 9, and therefore the determination unit 13b deletes the record of the operation 8 from the operation log.

Next, upon the operation 10 being performed, the event detection unit 13a acquires the occurrence time "12:18" and the event occurrence position (85,102), acquires a captured image 10 (see FIG. 21) as the captured image of the operation screen at the time, and notifies the determination unit 13b of the occurrence time "12:18", the event occurrence position (85,102), and the captured image 10.

Next, the determination unit 13b determines whether or not the determination images recorded in the operation type management table are present in the captured image 10 indicated by the notification, and calculates the occurrence position of the event in each of the determination image 1, the determination image 2, and the determination image 3 that are present. Regarding the determination image 1, the top left coordinates of the matching position are (10,20), and the determination unit 13b calculates the display area, considering the position, the size, and the shape specified in each operation type. For the operation type 1, a rectangular area with the top left at (30,23) and the bottom right at (80,31) is acquired. For the operation type 2, a rectangular area with the top left at (30,35) and the bottom right at (67,43) is acquired. For the operation type 3, a rectangular area with the top left at (30,47) and the top right at (80,55) is acquired. For the operation type 4, a circular area centered around (53,64) is acquired. For the operation type 5, a circular area centered around (53,71) is acquired. For the operation type 6, a circular area centered around (53,77) is acquired.

Regarding the determination image 2, the top left coordinates of the matching position are (8,97), and the determination unit 13b calculates the display area, considering the position, the size, and the shape specified in the operation type. For the operation type 7, a rectangular area with the top left (9,83) and the bottom right (29,109) is acquired. For the operation type 8, a rectangular area with the top left (41,83) and the bottom right (61,109) is acquired. For the operation type 9, a rectangular area with the top left (73,83) and the top right (93,109) is acquired.

Regarding the determination image 3, the top left coordinates of the matching position are (8,59), and the determination unit 13b calculates the display area, considering the position, the size, and the shape specified in the operation type. For the operation type 10, a rectangular area with the top left at (8,79) and the bottom right at (78,96) is acquired.

Figure 29:
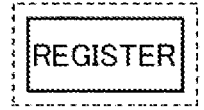
FIG. 29 is a diagram showing an example of an operation image 10 recorded as an operation log.

The event occurrence position (85,102) indicated by the notification is included in the area corresponding to the operation type 9. Therefore, the determination unit 13b records the event occurrence time, the operation type 9, and the operation image 10 illustrated in FIG. 29, which is the captured image of a rectangular area moved from the matching position (8,97) by (64,1) and having a size (22,12), as an operation log. FIG. 29 is a diagram showing an example of the operation image 10 recorded as an operation log.

In this way, the operation log acquisition device 10 performs the above-described processing for the operations 1 to 10, and, as a result, an operation log 701 as illustrated in FIG. 30. FIG. 30 is a diagram showing examples of operation logs. Operation logs may be output to a file in the CSV format, or to Excel or a database in a tabular format.

Figure 31:
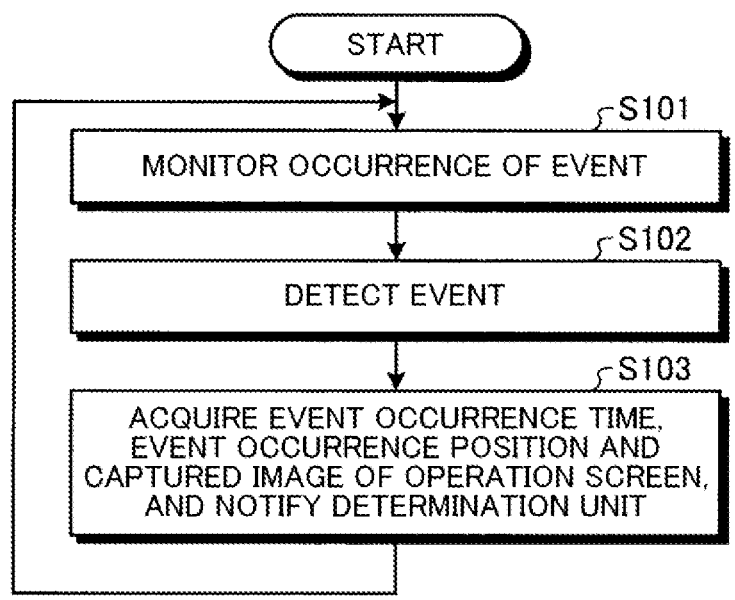
FIG. 31 is a flowchart showing an example of the flow of processing that is performed by an event detection unit in the operation log acquisition device according to the first embodiment.
Figure 32:
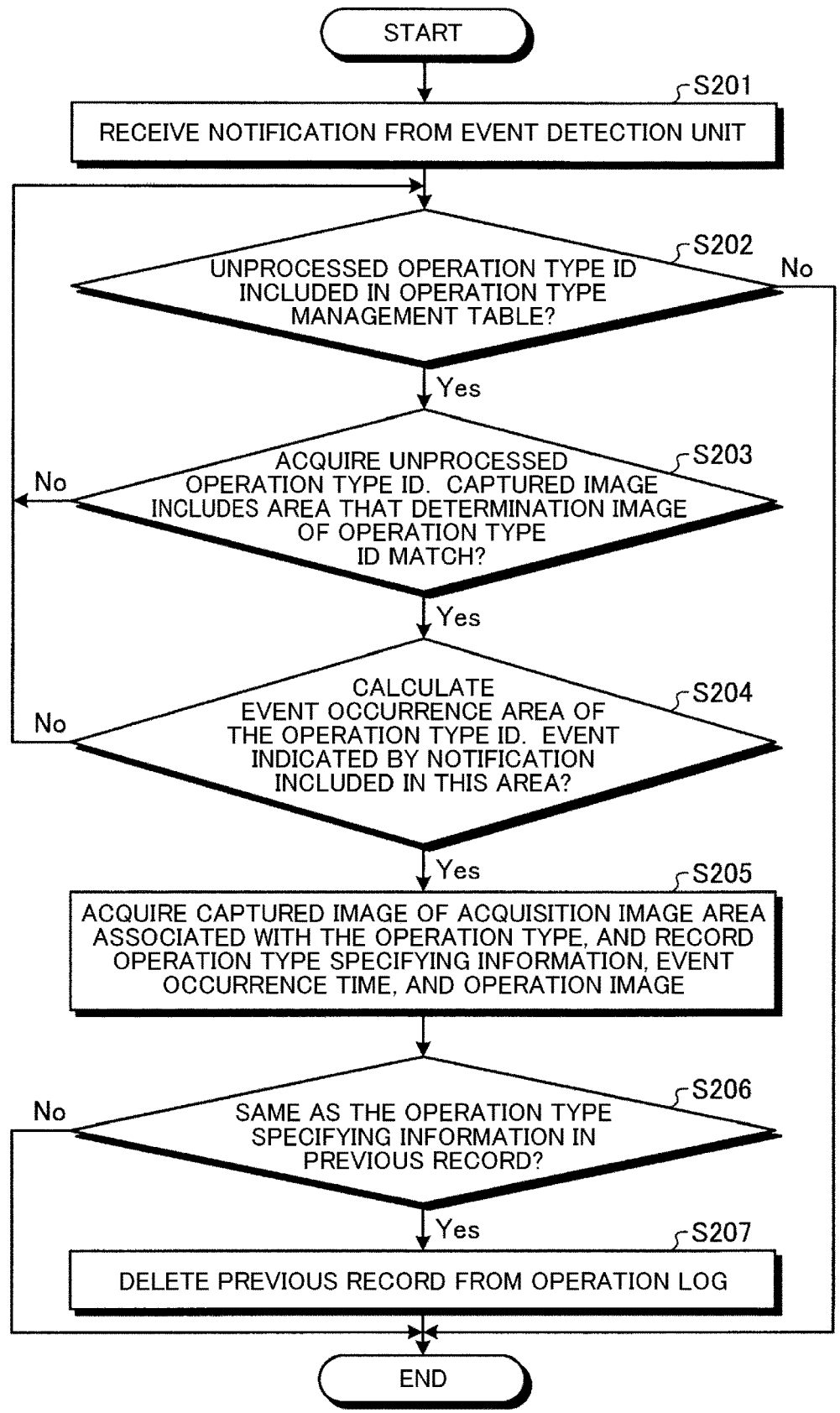
FIG. 32 is a flowchart showing an example of the flow of processing that is performed by a determination unit in the operation log acquisition device according to the first embodiment.

[Processing Procedure Performed by Operation Log Acquisition Device] Next, an example of a processing procedure that is performed by the operation log acquisition device 10 according to the first embodiment will be described with reference to FIGS. 31 and 32. FIG. 31 is a flowchart showing an example of the flow of processing that is performed by the event detection unit in the operation log acquisition device according to the first embodiment. FIG. 32 is a flowchart showing an example of the flow of processing that is performed by the determination unit in the operation log acquisition device according to the first embodiment.

First, processing that is performed by the event detection unit 13a will be described with reference to FIG. 31. As illustrated in FIG. 31, the event detection unit 13a of the operation log acquisition device 10 monitors the occurrence of an event (step S101). Upon detecting an even (step S102), the event detection unit 13a acquires the event occurrence time, the event occurrence position, and a captured image of the operation screen, and notifies the determination unit 13b of the event occurrence time, the event occurrence position, and the captured image (step S103). Thereafter, the event detection unit 13a returns to step S101 and repeats the above-described processing.

Next, processing that is performed by the determination unit 13b will be described with reference to FIG. 32. As illustrated in FIG. 32, upon receiving a notification from the event detection unit 13a including the event occurrence time, the event occurrence position, and the captured image (step S201), the determination unit 13b of the operation log acquisition device 10 determines whether or not an unprocessed operation type ID is included in the operation type management table (step S202).

As a result, upon determining that an unprocessed operation type ID is not included in the operation type management table (negative in S202), the determination unit 13b terminates processing without change. Upon determining that an unprocessed operation type ID is included in the operation type management table (affirmative in S202), the determination unit 13b acquires the unprocessed operation type ID, and determines whether or not the captured image include an area that the determination image indicated by the operation type ID matches (step S203).

As a result, upon determining that the captured image does not include an area that the determination image indicated by the operation type ID matches (negative in step S203), the determination unit 13b returns to the processing in step S202. Upon determining that the captured image includes an area that the determination image indicated by the operation type ID matches (affirmative in step S203), the determination unit 13b calculates the event occurrence area of the operation type ID, and determines whether or not the event indicated by the notification is included in this area (step S204).

As a result, upon determining that the event indicated by the notification is not included in the event occurrence area (negative in step S204), the determination unit 13b returns to the processing in step S202. Upon determining that the event indicated by the notification is included in the event occurrence area (affirmative in step S204), the determination unit 13b acquires the operation image that is the captured image of the acquisition image area associated with the operation type, and records operation type specifying information, the event occurrence time, and the operation image (step S205).

Thereafter, the determination unit 13b determines whether or not the operation type specifying information recorded this time is the same as the operation type specifying information previously recoded (step S206), and upon determining that the operation type specifying information recorded this time is the same as the operation type specifying information previously recoded (affirmative in step S206), the determination unit 13b deletes the previous record from the operation log (step S207), and terminates processing. Upon determining that the operation type specifying information recorded this time is not the same as the operation type specifying information previously recoded (negative in step S206), the determination unit 13b terminates processing without change.

[Effects of First Embodiment] As described above, the operation log acquisition device 10 according to the first embodiment includes a storage unit 14 that stores determination images, which are images of a characteristic area of an operation screen that is used to perform a predetermined operation, an event occurrence area in which an event may occur when a predetermined operation is performed, operation type specifying information that specifies an operation type, and an acquisition image area that is to be acquired when a predetermined operation is performed, in associated with each other. The operation log acquisition device 10, upon detecting the occurrence of an event, acquires an occurrence time of the event, an occurrence position of the event, and a captured image of the operation screen. Next, the operation log acquisition device 10 determines whether or not a matching area that the determination image matches is included in the acquired captured image, acquires the event occurrence area of the image if the captured image includes the matching area, acquires an operation image that is a captured image of the acquisition image area if the occurrence position of the event is included in the event occurrence area, and records operation type specifying information that corresponds to the determination image, the occurrence time of the event, and the operation image, in the storage unit 14 in association with each other as an operation log. Therefore, the operation log acquisition device 10 can acquire events that are meaningful to the analyst regardless of the execution environment of an application.

That is to say, the operation log acquisition device 10 only uses information that can be generally acquired independent of a specific environment, such as a captured image of the operation screen and event occurrence positions so that the operation log acquisition device 10 can acquire operation logs regarding any application regardless of the application type thereof. Also, with the operation log acquisition device 10, an analyst can intuitively specify the type of an event by specifying the event to be acquired in association with an image on the operation screen, and such information can be recorded as an operation log in the form with which the analyst can easily specify the operation.

[System Configuration, etc.] The constituent elements of each of the illustrated devices show functional concepts, and do not necessarily have the same physical configurations as illustrated in the drawings. That is to say, the specific modes in which the devices are distributed/integrated are not limited to those shown in the drawings, and all or some of the device may be functionally or physically distributed/integrated in any unit according to various loads and usage conditions. Although the above embodiment described a case in which an event occurring on the operation screen displayed on the operation log acquisition device is detected and an operation log is recorded, the present invention is not limited to such a case. For example, the operation log acquisition device may detect an event occurring on the operation screen displayed on another device, and record operation log. Furthermore, all or any of the processing functions performed by the devices may be realized using a CPU and a program analyzed and executed by the CPU, or realized as hardware using a wired logic.

In addition, among the processing described in the present embodiment, all or part of the processing described as being automatically performed may be manually performed, and all or part of the processing described as being manually performed may be automatically performed using a well-known method. In addition, the processing procedures, control procedures, specific names, and information including various kinds of data and parameters shown in the above document and the drawings may be changed in any manner unless otherwise specified.

Figure 33:
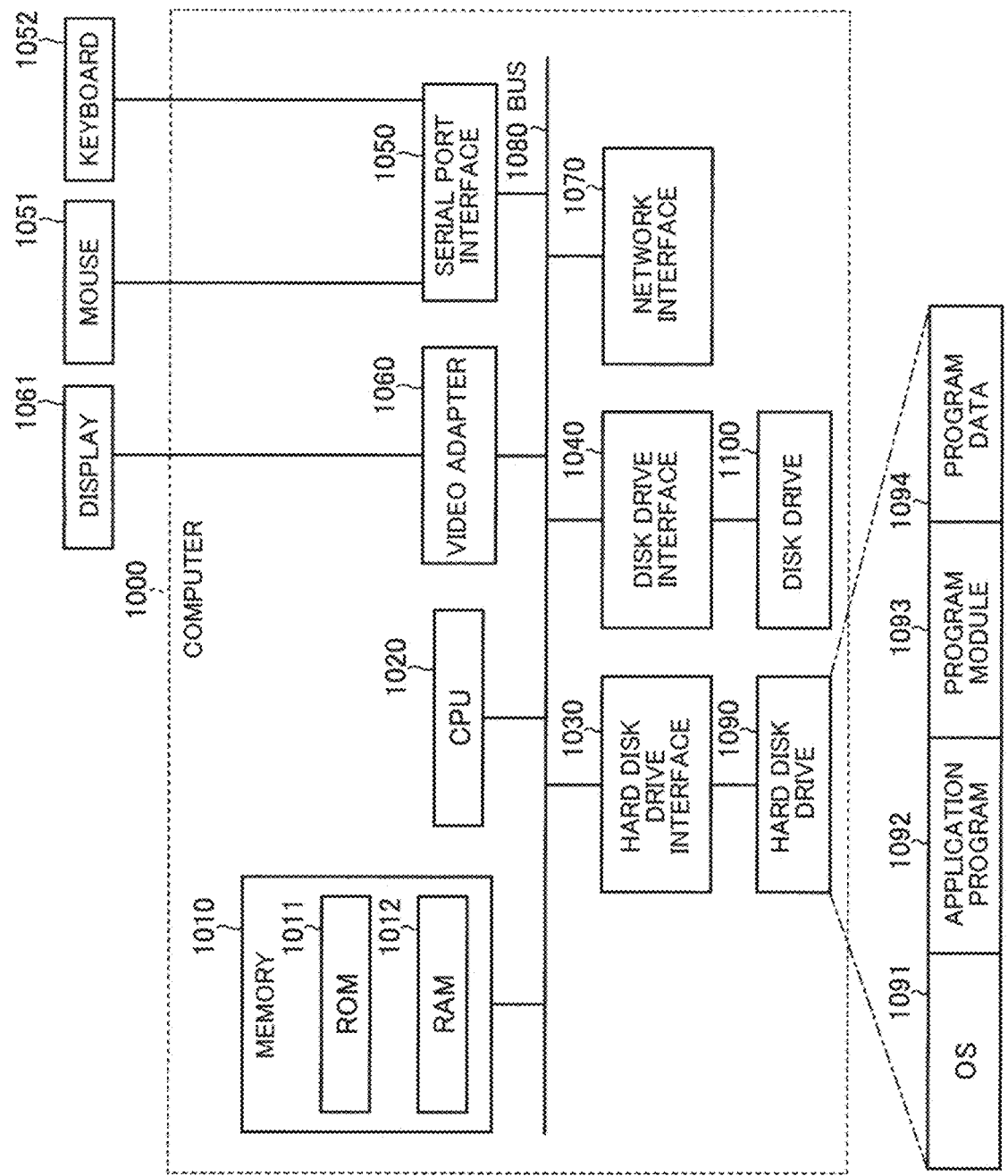
FIG. 33 is a diagram showing a computer that executes an operation log acquisition program.

[Program] FIG. 33 is a diagram showing a computer that executes an operation log acquisition program. A computer 1000 includes a memory 1010 and a CPU 1020, for example. The computer 1000 also includes a hard disk drive interface 1030, a disk drive interface 1040, a serial port interface 1050, a video adapter 1060, and a network interface 1070. The units are connected to each other via a bus 1080.

The memory 1010 includes a ROM (Read Only Memory) 1011 and a RAM 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100. For example, a removable storage medium such as a magnetic disk or an optical disc is to be inserted into the disk drive 1100. The serial port interface 1050 is connected to a mouse 1051 and a keyboard 1052, for example. The video adapter 1060 is connected to a display 1061, for example.

The hard disk drive 1090 stores, for example, an OS 1091, an application program 1092, a program module 1093, and program data 1094. Programs that define various kinds of processing to be performed by the operation log acquisition device 10 are implemented as a program module 1093 in which codes that are executable by a computer are written. The program module 1093 is stored in the hard disk drive 1090, for example. For example, a program module 1093 for executing the same processing as the functional components of the devices is stored in the hard disk drive 1090. Note that the hard disk drive 1090 may be replaced with an SSD (Solid State Drive).

In addition, data to be used in the processing in the above-described embodiment is stored in, for example, the memory 1010 or the hard disk drive 1090 as program data 1094. The CPU 1020 reads out and loads the program module 1093 or the program data 1094 stored in the memory 1010 or the hard disk drive 1090 to the RAM 1012 when necessary, and executes it.

Note that the program module 1093 and the program data 1094 are not limited to being stored in the hard disk drive 1094, and may be stored in a removable storage medium, for example, and read out by the CPU 1020 via the disk drive 1100 or the like. Alternatively, the program module 1093 and the program data 1094 may be stored in another computer that is connected to a network or a WAN. The program module 1093 and the program data 1094 may be read out by the CPU 1020 from the other computer via the network interface 1070.

REFERENCE SIGNS LIST

10 Operation log acquisition device
11 Input unit
12 Output unit
13 Control unit
13a Event detection unit
13b Determination unit
13c Order ID acquisition unit
14 Storage unit
14a Operation type management table storage unit
14b Order ID acquisition method management table storage unit
14c Operation log storage unit

The invention claimed is:

1. A device for logging user operations, the device comprising:
processing circuitry configured to:
store a determination image that is an image of a characteristic area of an operation screen that is used to perform a predetermined operation, an event occurrence area in which an event may occur when the predetermined operation is performed, the event occurrence areas are different with each other for each operation type, operation type specifying information that specifies the operation type, and an acquisition image area that is to be acquired when the predetermined operation is performed, in association with each other;
monitor user input events for user inputs via one or more input devices;
upon detecting an occurrence of a user input event, acquire an occurrence time of the user input event, an occurrence position of the user input event on the operation screen, and a captured image of the operation screen; and
determine whether or not the captured image acquired includes a matching area that the determination image matches, acquire event occurrence areas of the determination image corresponding to each operation type, respectively, if the captured image includes the matching area, determine whether the occurrence position of the user input event is included in the event occurrence area, acquire an operation image that is a captured image of the acquisition image area if the occurrence position of the user input event is included in any of the acquired event occurrence areas, and record operation type specifying information that corresponds to the determination image, the occurrence time of the user input event, and the operation image, in association with each other as an operation log.

2. The device according to claim 1, wherein, when the operation screen is displayed, information that specifies an order is acquired from the operation screen based on a predetermined rule, and the acquired information is recorded as the operation log.

3. An operation log acquisition method executed by an operation log acquisition device, the operation log acquisition method comprising:
storing a determination image that is an image of a characteristic area of an operation screen that is used to perform a predetermined operation, an event occurrence area in which an event may occur when the predetermined operation is performed, the event occurrence areas are different with each other for each operation type, operation type specifying information that specifies the operation type, and an acquisition image area that is to be acquired when the predetermined operation is performed, in association with each other;
monitoring user input events for user inputs via one or more input devices;
upon detecting an occurrence of a user input event, acquiring an occurrence time of the user input event, an occurrence position of the user input event on the operation screen, and a captured image of the operation screen; and
determining whether or not the captured image acquired includes a matching area that the determination image matches, acquiring event occurrence areas of the determination image corresponding to each operation type, respectively, if the captured image includes the matching area, determining whether the occurrence position of the user input event is included in the event occurrence area, acquiring an operation image that is a captured image of the acquisition image area if the occurrence position of the user input event is included in any of the acquired event occurrence areas, and recording operation type specifying information that corresponds to the determination image, the occurrence time of the user input event, and the operation image, in association with each other as an operation log.

4. A non-transitory computer-readable recording medium storing therein an operation log acquisition program that causes a computer to execute a process comprising:
storing a determination image that is an image of a characteristic area of an operation screen that is used to perform a predetermined operation, an event occurrence area in which an event may occur when the predetermined operation is performed, the event occurrence areas are different with each other for each operation type, operation type specifying information that specifies the operation type, and an acquisition image area that is to be acquired when the predetermined operation is performed, in association with each other;
monitoring user input events for user inputs via one or more input devices;
upon detecting an occurrence of a user input event, acquiring an occurrence time of the user input event, an occurrence position of the user input event on the operation screen, and a captured image of the operation screen; and
determining whether or not the captured image acquired includes a matching area that the determination image matches, acquiring event occurrence areas of the determination image corresponding to each operation type, respectively, if the captured image includes the matching area, determining whether the occurrence position of the user input event is included in the event occurrence area, acquiring an operation image that is a captured image of the acquisition image area if the occurrence position of the user input event is included in any of the acquired event occurrence areas, and recording operation type specifying information that corresponds to the determination image, the occurrence time of the user input event, and the operation image, in association with each other as an operation log.

* * * * *